United States Patent [19]

Wood et al.

[11] 4,455,063
[45] Jun. 19, 1984

[54] LUNEBURG LENS FOR WAVEGUIDE WITH GRADED INDEX PROFILE

[75] Inventors: Van E. Wood, Delaware; Richard P. Kenan, Upper Arlington, both of Ohio

[73] Assignee: Canon Kabushiki Kaisha, Tokyo, Japan

[21] Appl. No.: 254,472

[22] Filed: Apr. 15, 1981

[51] Int. Cl.³ .............................................. G02B 5/174
[52] U.S. Cl. ................... 350/96.12; 350/96.11
[58] Field of Search ............... 350/96.11, 96.12, 96.13, 350/96.31; 343/911 L

[56] References Cited

U.S. PATENT DOCUMENTS

| 4,253,060 | 2/1981 | Chen | 350/96.14 |
| 4,273,445 | 6/1981 | Thompson et al. | 350/96.11 |
| 4,297,704 | 10/1981 | Marom et al. | 350/96.13 |
| 4,348,074 | 9/1982 | Burns et al. | 350/96.12 |

OTHER PUBLICATIONS

Yao, S. K., "Theoretical Model of Thin Film Deposition Profile with Shadow Effect", J. App. Physc., 50, 3390 5/79.
Suematsu et al., "Focusing Properties of Thin-Film Lenslike Light Guide for Integrated Optics," Appl. Phys. Lett., vol. 23, No. 2, Jul. 1973, pp. 78–79.
H. Kogelnik and V. Ramaswamy, Scaling Rules for Thin-Film Optical Waveguides, Appl. Optics, 13, 1857 (1974).
S. K. Yao et al., Guided-Wave Optical Thin-Film Luneburg Lenses: Fabrication Technique and Properties, Appl. Optics, 18, 4067 (1979).
W. H. Southwell, Inhomogeneous Optical Waveguide Lens Analysis, J. Opt. Soc. Am., 67, 1004 (1977).
G. Benjamin Hocker and William K. Burns, Modes in Diffused Optical Waveguides of Arbitrary Index Profile, IEEE J. Quantum Electric., 11, 270 (1975).

Primary Examiner—John D. Lee
Assistant Examiner—Robert E. Wise
Attorney, Agent, or Firm—Fitzpatrick, Cella, Harper & Scinto

[57] ABSTRACT

A Luneburg lens is provided on a diffused waveguide having a graded index profile and has a contour computed in accordance with the graded index in the waveguide.

4 Claims, 3 Drawing Figures

LUNEBURG LENS FOR WAVEGUIDE WITH GRADED INDEX PROFILE

BACKGROUND OF THE INVENTION

1. Field of the Invention

The present invention relates to Luneburg lenses and more particularly it concerns a novel Luneburg lens provided on an optical waveguide having a graded index profile, the lens having a thickness contour in accordance with the index profile of the waveguide.

2. Description of the Prior Art

A number of electro-optic and acousto-optic devices having a planar configuration have been developed for use as switches, deflectors, and RF spectrum analyzers. In these devices thin-film waveguide lenses are used for imaging, spatial filtering and focusing. The lenses for such applications should have high efficiency and high performance. Further, accuracy is essential for more precise applications where a well-collimated guided beam or sufficiently small spot size are required. Here accuracy means that the lens shape must be accurate enough to satisfy the design specifications.

A typical integrated optical lens often considered for incorporation into such devices is the Luneburg lens. S. K. Yao, et al., *GUIDED-Wave Optical Thin-Film Luneburg Lenses: Fabrication Technique and Properties*, App. Optics, 18,4067 (1979). This lens is fabricated by sputtering or evaporating the lens material onto the waveguide surface through a circular mask having shaped edges. The Luneburg lens has several advantages over other types of lenses for integrated device applications. First, such lenses are low in cost. This is because the appropriately made mask is repeatedly usable. Moreover, the lens materials are relatively inexpensive and only a small amount is needed for each lens. Still further, there is a wide selection of materials with a refractive index higher than that of the available waveguide materials so that one can choose the most suitable lens material for a particular purpose. In addition, fabrication is easy since it involves a conventional deposition apparatus and the thickness of the film is highly controllable although it is very important to control the lens shape since the lens characteristics are very sensitive to the film thickness and the index distribution. Finally, diffraction-limited lenses with accurately predictable focal length can be routinely made.

However, some applications, such as RF spectrum analyzers and ray scanning modules, require much more accurate focal lengths i.e. better than 1% and focal spot sizes of a few microns. Therefore, for such application, very precise Luneburg lens designs are required.

The conventional design of the Luneburg lens is based on the assumption that the waveguide thereunder is uniform and the refractive index thereof is of constant value. W. H. Southwell, *Inhomogeneous Optical Waveguide Lens Analysis*, J. Opt. Soc. Am., 67,1004 (1977). But in practice the method often employed for fabrication of the waveguide is thermal diffusion of a metal, such as titanium, into a substrate material of ferroelectric crystals, such as $LiNbO_3$ or $LiTaO_3$. Consequently, the index of the waveguide has a graded profile because the concentration of the diffused metal varies in the direction of diffusion and the index profile can be considered to follow the concentration profile. Provided that the deposited metal layer is sufficiently thin and that the concentration of diffused metal follows a simple diffusion equation, the concentration profile can be expressed as a Gaussian distribution function. Moreover, the distribution function may be changed into, for example, a simple exponential function or an Erfc function (complementary error function) in accordance with other diffusion conditions.

Thus the conventional Luneburg lens design in which a step-index profile is used as the index distribution of the waveguide does not provide sufficiently accurate results, and other lens designs must be considered in which the variation of the index profile of the waveguide is taken into account.

SUMMARY OF THE INVENTION

The present invention avoids the disadvantages of the prior art by means of a novel Luneburg lens taking into account the graded index profile of the waveguide.

In accordance with one aspect of the invention there is provided a Luneburg lens comprising a waveguide having graded index distribution and a Luneburg lens overlay on said waveguide, said overlay having a contour in accordance with the graded index distribution of said waveguide.

In accordance with another aspect of the invention, there is provided a Luneburg lens comprising a waveguide having a graded index distribution approximated by a Gaussian profile; and an overlay on said waveguide having a thickness profile:

$$T(R) = \frac{\Lambda}{V}(c-b)^{-\frac{1}{2}}\tan^{-1}\left[\frac{\alpha_1(\tau+1) - \alpha_2(\tau-1)}{\tau+1+\alpha_1\alpha_2(\tau-1)}\right]$$

when $N(R) < n_s$; and $$T(R) = (\Lambda/V)(c-b)^{-\frac{1}{2}}[\tan^{-1}\alpha_1 + \tan^{-1}\alpha_2]$$

when $N(R) > n_s$ where:
$N(R)$: mode index in the Luneburg Lens
$n_s$: index at the bare waveguide surface
$n_b$: index deep inside the waveguide
$\Lambda$: diffusion length where refractive index change is assumed to follow Ti concentration
$\alpha_1 = [(a+b)/(c-b)]^{\frac{1}{2}}$
$\alpha_2 = [(b-1)\text{sgn}(b-1)/(c-b)]^{\frac{1}{2}}$
$\tau = \tan VI_1$
$V = K_t hd\, o\Lambda\sqrt{n_s^2 - n_b^2}$
$a = (n_b^2 - 1)/(n_s^2 - n_b^2)$
$b = ([N(R)]^2 - n_b^2)/(n_s^2 - n_b^2)$
$c = (n_f^2 - n_b^2)/(n_s^2 - n_b^2)$ $$I_1 = \int_o^\xi [\exp(-x^2) - b]^{\frac{1}{2}}dx$$

$\xi = (-\log_e b)^{\frac{1}{2}}$
$K_o = 2\pi/\lambda$
$n_f$: refractive index of lens material
$\lambda$: wavelength of light used There has thus been outlined the more important features of the invention in order that the detailed description thereof that follows may be better understood and in order that the present contribution to the art may be better appreciated. There are, of course, additional features of the invention which will be described hereinafter and which will form the subject matter of the claims appended hereto. Those skilled in the art will appreciate that this invention may be utilized as a basis for forming other structures for carrying out the several purposes of the invention. It is therefore important that the claims be regarded as including such equivalent structures as do not depart from the scope of the invention.

BRIEF DESCRIPTION OF THE DRAWINGS

One embodiment of the present invention has been chosen for purposes of illustration and description and is shown in the accompanying drawings forming a part of the specification, wherein.

DETAILED DESCRIPTION OF THE PREFERRED EMBODIMENT

Figure 1:
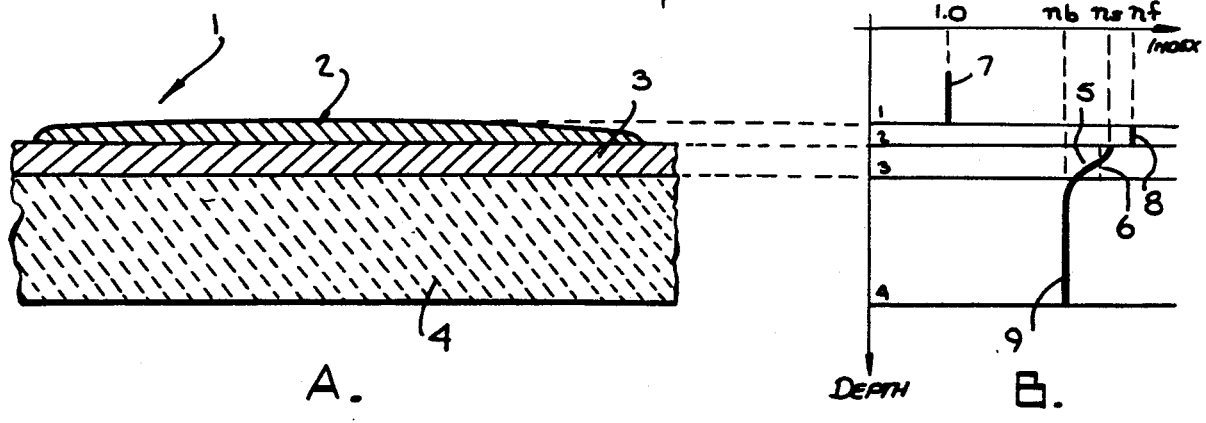
FIG. 1A is a schematic cross-section of a Luneburg lens formed on a waveguide in accordance with the present invention.
FIG. 1B is a schematic diagram of the index distribution of the cross-section shown in FIG. 1A.

FIG. 1A schematically illustrates a four layer optical device with different indices of refraction and FIG. 1B shows a typical distribution of indices corresponding to each layer. The four layers consist of an outer layer 1 of air with a refractive index of $n_{air} \ne 1.00$, a lens region 2 of $As_2S_3$ with an index of $n_f$, an optical waveguide 3 of Ti in-diffused $LiNbO_3$ with an index of $n(y)$, and a substrate of $LiNbO_3$ having an index of $n_b$. Of course other materials may be used for the several layers of the optical device.

The optical waveguide 3 in FIG. 1A is fabricated by thermal diffusion of titanium, which is evaporated onto a ferroelectric crystal substrate 4 of $LiNbO_3$. Since the concentration of titanium has a nonhomogeneous distribution, the index $n(y)$ varies as shown by profile curve 5 in FIG. 1B which is quite different from the conventional step index profile shown by broken line 6. The indices for air, the lens region and the substrate are represented by reference numerals 7, 8 and 9, respectively.

In the present invention the graded index profile is approximately by a Gaussian contour as follows:

$$n(y) = n_b + (n_s + n_b)\exp(-y^2/\Lambda^2), \quad (1)$$

where $n_b$ is the refractive index deep in the bulk of the crystal and $n_s$ is the index at the surface. $\Lambda$ is the diffusion length if the refractive index change is assumed accurately to follow the Ti concentration, and y is the distance from the surface into the crystal. The spatially-varying dielectric permittivity $\epsilon(Y) = [n(Y)]^2$ to calculate the waveguide mode properties by the WKB method[1/] is, to a good approximation, given by $$\epsilon(Y) = n_b^2 + (n_s^2 - n_b^2)\exp(-y^2/\Lambda^2) \quad (2)$$

since $n_s - n_b$ is small.

[1/] G. Benjamin Hocker and William K. Burns, *Modes in Diffused Optical Waveguides of Arbitrary Index Profile*, IEEE J. Quantum Electr., 11, 270 (1975).

As reported in W. H. Southwell, *Index Profiles for Generalized Luneburg Lenses and Their Use in Planar Optical Waveguides*, J. Opt. Soc. Am., 67, 1010 (1977), an effective index n at arbitrary point r is given by the solutions for the equations:

$$n = \exp[w(\rho, s)] \quad (3)$$

$$\rho = nr \quad (4)$$

and $$w(\rho, s) = \frac{1}{\pi} \int_\rho^1 \frac{\arcsin(x/s)}{(x^2 - \rho^2)^{\frac{1}{2}}} dx \quad (5)$$

These simultaneous equations cannot be solved analytically, and numerical solutions are shown in Table 1 of the above Southwell article.

The variables used above are defined as follows:

(1) n is the normalized effective index of the lens and the mode index N(R) is given by $$N(R) = n_{eff} \cdot n \quad (6)$$

where $n_{eff}$ is the effective index of the waveguide outside the lens region and is determined by the integral equation described in the Hocker et al. article, and n is a function of R, R being defined by equation (7).

(2) r is also the normalized radius and if the actual lens radius is given by $R_o$ the arbitary position R (the radial distance from the center of the lens) in the actual lens is given by $$R = R_o \cdot r \quad (7)$$

(3) s is twice the f-number of the lens. If the focal length f is given, s is obtained by $f/R_o$.

With the aid of these variable transforms and the numerical values, the mode index N(R) is given as a function of position R.

Thus the actual lens shape can be obtained numerically.

Given this lens shape, the overlay lens thickness T required to produce the desired mode-index changes in the inhomogeneous waveguide can be calculated from the appropriate electro-magnetic equation and boundary conditions, the boundary conditions being the continuity of the tangential component of the electric and magnetic fields at each interface, to obtain:

(i) $N(R) < n_s$ $$\tan \frac{VT}{\Lambda}(c-b)^{\frac{1}{2}} = \frac{\alpha_1(\tau+1) - \alpha_2(\tau-1)}{\tau + 1 + \alpha_1\alpha_2(\tau-1)} \text{ or} \quad (8)$$

$$T(R) = \frac{\Lambda}{V}(c-b)^{-\frac{1}{2}} \tan^{-1}\left[\frac{\alpha_1(\tau+1) - \alpha_2(\tau-1)}{\tau + 1 + \alpha_1\alpha_2(\tau-1)}\right] \quad (8')$$

and (ii) $N(R) > n_s$ $$\frac{VT}{\Lambda}(c-b)^{\frac{1}{2}} = \tan^{-1}\alpha_1 + \tan^{-1}\alpha_2 \text{ or} \quad (9)$$

$$T(R) = \frac{\Lambda}{V}(c-b)^{-\frac{1}{2}}[\tan^{-1}\alpha_1 + \tan^{-1}\alpha_2] \quad (9')$$

where:

$$\alpha_1 = [(a+b)/(c-b)]^{\frac{1}{2}} \quad (10)$$

$$\alpha_2 = [(b-1)\text{sgn}(b-1)/(c-b)]^{\frac{1}{2}} \quad (11)$$

$$\tau = \tan VI_1 \text{ and } V = K_o\Lambda\sqrt{n_s^2 - n_b^2} \quad (12)$$

Furthermore:

$$a = (n_b^2 - 1)/(n_s^2 - n_b^2) \quad (13)$$

$$b = ([N(R)]^2 - n_b^2)/(n_s^2 - n_b^2) \quad (14)$$
$$c = (n_f^2 - n_b^2)/(n_s^2 - n_b^2) \quad (15)$$

and $I_1$ is the WKB integral $$I_1 = \int_0^\xi [\exp(-x^2) - b]^{\frac{1}{2}} dx$$

with $\xi = (-\log_e b)^{\frac{1}{2}}$. $n_f$ is the refractive index of the lens material, and $K_o = 2\pi/\lambda$, where $\lambda$ is the wavelength of the light used. The quantities a, b and c represent a slight generalization of the scaling parameters in H. Kogelnik and V. Ramaswamy, *Scaling Rules for Thin-Film Optical Waveguides*, Appl. Optics, 13, 1857 (1974).

Strictly speaking, these equations hold for TE polarization. With only the use of the appropriate value for $n_b$ and $n_s$, the present formulation is sufficiently accurate for TM polarization.

With values in Table 1 and the solutions of equations (3) to (6), a representative lens thickness profile is obtained numerically.

With such a thickness profile a Luneburg lens may then be formed by conventional methods such as evaporation or sputtering through appropriately contoured and positioned masks.

Figure 2:
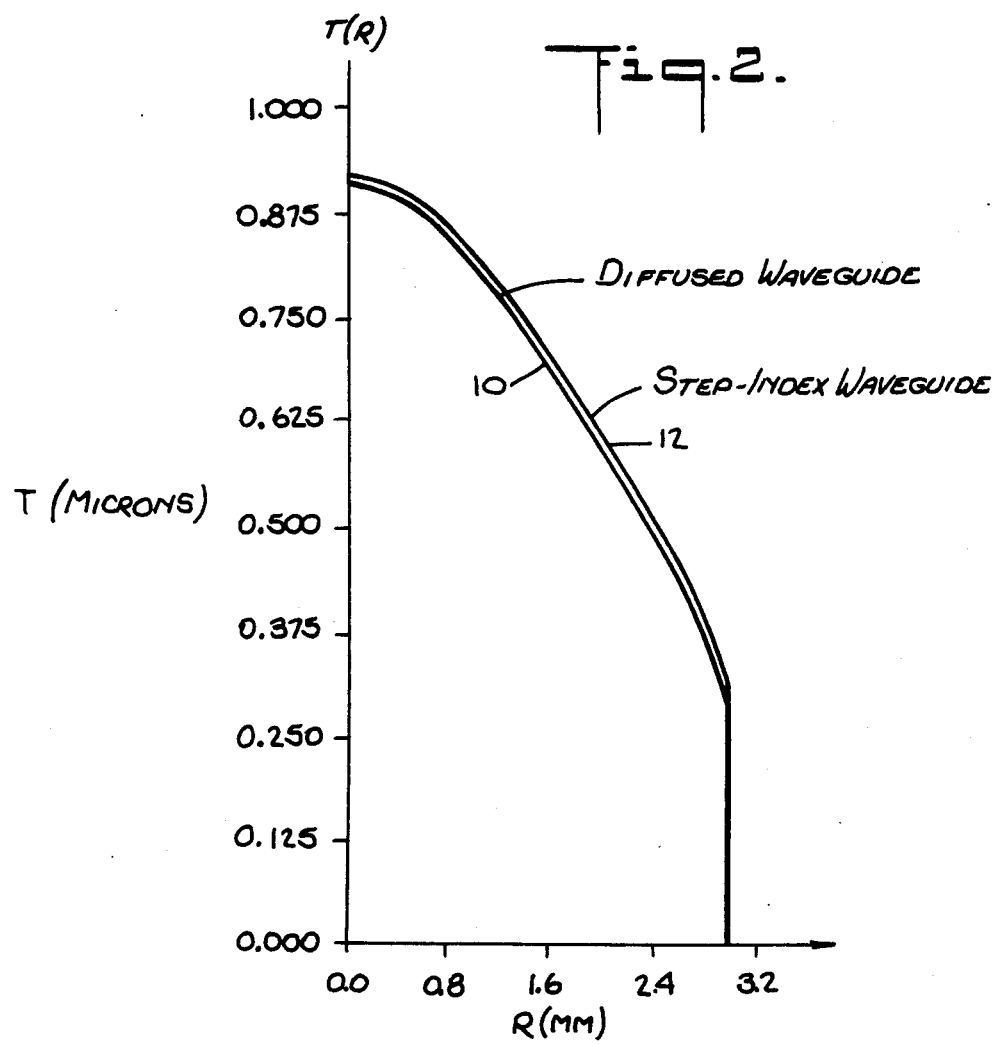
FIG. 2 is a calculated plot for a Luneburg lens thickness profile for a diffused waveguide and for a step index waveguide.

FIG. 2 shows graphical plots of the designed lens and indicates the difference of the lens shapes between the present graded-index profile 10 and the conventional step-index profile 12. The present lens design is thinner at the center than the conventional one and falls off somewhat more rapidly near the edge. The difference between these two lens shapes cannot be neglected where crucial specifications are assigned to the lens for integrated optical device applications. For example, a mere one percent change in lens thickness could give twice as large a spot size.

TABLE 1

| wavelength $\lambda$ | 0.83 µm |
|---|---|
| lens diameter r | 6.0 mm |
| focal length f | 25.9 mm |
| F-number | 4.3 |
| $n_f$ (As$_2$S$_3$) | 2.37 |
| $n_b$ (LiNbO$_3$) | 2.252 (ordinary) |
| V | 4.383 |
| $b_{max}$* | 0.409 |
| $n_s$ | 2.268 |
| $\Lambda$ | 2.13 µm |

*$b_{max}$ is the maximum solution of the WKB equations for a single-mode Gaussian guide outside the lens region.

Having thus described the invention with particular reference to the preferred forms thereof, it will be obvious to those skilled in the art to which the invention pertains, after understanding the invention, that various changes and modifications may be made therein without departing from the scope of the invention as defined by the claims appended hereto.

What is claimed is:

1. A Luneburg lens device comprising:
   a waveguide having a graded-index distribution;
   a Luneburg lens overlay on said waveguide, said overlay having a shape defined by the graded-index distribution in the waveguide.

2. A Luneburg lens device according to claim 1, wherein said overlay has a shape defined by a Gaussian index distribution in the waveguide.

3. A Luneburg lens device according to claim 1, wherein said lens is thinner at the center region than a lens formed in accordance with a step index profile.

4. A Luneburg lens device comprising:
   a waveguide having a graded-index distribution approximated by a Gaussian shape; and
   a Luneburg lens overlay on said waveguide, said overlay having a thickness T(R) as follows:

$$T(R) = \frac{\Lambda}{V}(c-b)^{-\frac{1}{2}} \tan^{-1}\left[\frac{\alpha_1(\tau+1) - \alpha_2(\tau-1)}{\tau + 1 + \alpha_1\alpha_2(\tau-1)}\right]$$

when $N(R) < n_s$; and $$T(R) = \Lambda/V(c-b)^{-\frac{1}{2}}[\tan^{-1}\alpha_1 + \tan^{-1}\alpha_2]$$

when $N(R) > n_s$ where:
N(R): mode index in the Luneburg Lens;
$n_s$: index at the waveguide surface
$n_b$: index deep inside the waveguide
$\Lambda$: diffusion length where refractive index change is assumed to follow Ti concentration
$\alpha_1 = [(a+b)/(c-b)]^{\frac{1}{2}}$
$\alpha_2 = [(b-1)\text{sgn}(b-1)/(c-b)]^{\frac{1}{2}}$
$\tau = \tan VI_1$
$V = K_o\Lambda\sqrt{n_s^2 - n_b^2}$
$a = (n_b^2 - 1)/(n_s^2 - n_b^2)$
$b = ([N(R)]^2 - n_b^2)/(n_s^2 - n_b^2)$
$c = (n_f^2 - n_b^2)/(n_s^2 - n_b^2)$ $$I_1 = \int_0^\xi [\exp(-x^2) - b]^{\frac{1}{2}} dx$$

$\xi = (-\log_e b)^{\frac{1}{2}}$
$K_o = 2\pi/\lambda$
$n_f$: refractive index of lens material
$\lambda$: wavelength of light used.

* * * * *

UNITED STATES PATENT AND TRADEMARK OFFICE
CERTIFICATE OF CORRECTION

PATENT NO. : 4,455,063
DATED : June 19, 1984
INVENTOR(S) : VAN E. WOOD, ET AL.

It is certified that error appears in the above-identified patent and that said Letters Patent is hereby corrected as shown below:

Column 2, line 47, "$V=Kthdo\Lambda$ ..." should read --$V=K_o\Lambda$...--.

Column 3, line 26, "$n_{air}31\ 1.00$" should read --$n_{air}=1.00$--;

line 43, "approximately" should read --approximated--;

line 45, equation 1, "$n(y)=n_b+(n_s+n_b)$..." should read -- $n(y)=n_b+(n_s-n_b)$...--.

Column 6, line 7, insert --and-- after "distribution;".

Signed and Sealed this

Fifth Day of March 1985

[SEAL]

Attest:

DONALD J. QUIGG

Attesting Officer     Acting Commissioner of Patents and Trademarks